United States Patent
Yoshida et al.

(10) Patent No.: US 6,671,168 B2
(45) Date of Patent: Dec. 30, 2003

(54) SOLID ELECTROLYTIC CAPACITOR AND METHOD FOR MANUFACTURING THE SAME

(75) Inventors: Tsunenori Yoshida, Yawata (JP); Mikinari Shimada, Yawata (JP); Yasuhiko Nakada, Moriguchi (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 0 days.

(21) Appl. No.: 10/306,503

(22) Filed: Nov. 27, 2002

(65) Prior Publication Data

US 2003/0133256 A1 Jul. 17, 2003

(30) Foreign Application Priority Data

Nov. 30, 2001 (JP) .......... 2001-365847

(51) Int. Cl.[7] ............................ H01G 9/00
(52) U.S. Cl. .............. 361/523; 361/525; 29/25.03
(58) Field of Search ............. 361/523, 525, 361/528, 529, 532; 29/25.03

(56) References Cited

U.S. PATENT DOCUMENTS

| | | | |
|---|---|---|---|
| 4,959,753 A | | 9/1990 | Kudoh et al. |
| 5,017,272 A | | 5/1991 | Kamigawa |
| 5,145,753 A | * | 9/1992 | Irino et al. ............ 429/32 |
| 6,168,639 B1 | | 1/2001 | Taketani et al. |

FOREIGN PATENT DOCUMENTS

| | | |
|---|---|---|
| EP | 0 696 037 | 2/1996 |
| JP | 5-159979 | 6/1993 |
| JP | 6-77093 | 3/1994 |
| JP | 6-120086 | 4/1994 |
| JP | 6-82590 | 10/1994 |
| JP | 8-45790 | 2/1996 |
| JP | 9-246104 | 9/1997 |
| JP | 2810418 | 7/1998 |
| JP | 11-121279 | 4/1999 |
| JP | 2000-188239 | 4/2000 |
| JP | 2000-232036 | 8/2000 |
| JP | 2000-297142 | 10/2000 |

* cited by examiner

Primary Examiner—Anthony Dinkins
(74) Attorney, Agent, or Firm—Merchant & Gould P.C.

(57) ABSTRACT

The present invention provides a solid electrolyte capacitor with which both higher capacitance and lower ESR are achieved, as well as a method for manufacturing the same. The manufacturing method includes a step of forming, in a first solution, a first conductive polymer film serving as a portion of a conductive polymer layer, and a step of forming, in a second solution whose pH is lower than the pH of the first solution, a second conductive polymer film serving as another portion of the conductive polymer layer. The first conductive polymer film and the second conductive polymer film are both formed by electrolytic oxidative polymerization or by chemical oxidative polymerization. Thus, the conductive polymer layer includes a first conductive polymer film made of a plurality of particles, and a second conductive polymer film having an average particle size that is larger than the average particle size of those plurality of particles. The second conductive polymer film is formed such that it covers the apertures of the plurality of pores formed in the anode conductor, and the first conductive polymer film is formed such that at least a portion thereof is disposed inside the plurality of pores, or it is arranged as an outermost film of the conductive polymer layer.

20 Claims, 5 Drawing Sheets

SOLID ELECTROLYTIC CAPACITOR AND METHOD FOR MANUFACTURING THE SAME

FIELD OF THE INVENTION

The present invention relates to solid electrolytic capacitors and methods for manufacturing the same.

BACKGROUND OF THE INVENTION

In recent years, there has been a considerable increase in frequencies and electrical currents in integrated circuits of electronic appliances using solid electrolytic capacitors. There is thus a need for solid electrolytic capacitors with low equivalent series resistance (abbreviated as "ESR" below), large capacitance, and small loss.

The following explains an example of a conventional method for manufacturing a solid electrolytic capacitor's internal electrodes (that is, a capacitor element). First, a valve metal (for example tantalum) serving as an anode conductor is anodized in an electrolytic solution such as phosphoric acid, and an oxide film layer (dielectric layer) is formed on its surface. Then, a solid electrolyte is formed on the surface of this oxide film layer. A known solid electrolyte is, for example, manganese dioxide, which can be formed by immersing the anode conductor in a manganese nitrate solution, retrieving it, and calcining it. Finally, a cathode conductor is formed on the solid electrolyte. For the cathode conductor, it is possible to use a laminate of a carbon layer and an outer silver/conductive resin layer. In order to connect the capacitor element electrically to the outside, an anode lead terminal is connected to the anode conductor, and a cathode lead terminal is connected to the cathode conductor.

The resistances of all the respective parts affect the ESR, but what needs to be considered most for the resistance and opens room for improvement is the solid electrolyte. In order to reduce the resistance of the solid electrolyte, it has been proposed to use a conductive polymer material with a conductivity that is higher than that of manganese dioxide (whose conductivity is about 0.1 S/cm), and this also has been put to practice. For example, it is possible to realize a conductivity of about 100 S/cm using polypyrrole. As monomers other than pyrrole for forming the conductive polymer material, anilines, thiophenes and 3,4-ethylenedioxythiophene are known for example. The methods for forming the conductive polymer layer can be divided broadly into chemical oxidative polymerization and electrolytic oxidative polymerization.

The ESR also is affected by the contact resistance between the layers. JP 2000-232036A by the applicant of this application discloses the mixing of conductive polymer particles into the conductive polymer layer, and lowering the contact resistance between the conductive polymer layer and the cathode conductor with the irregularities formed by these particles. In the method described in this publication, the conductive polymer layer is formed by chemical oxidative polymerization using a polymerization solution in which conductive polymer particles are dispersed.

In order to increase the capacitance of the capacitor, it also has been proposed to form a conductive polymer layer in form of particles. JP H8-45790A discloses that a polypyrrole made of particles with a particle diameter of not more than 0.2 $\mu$m is formed by chemical oxidative polymerization using a polymerization solution in which the mol ratio at which the monomers are mixed with the oxidizer is at least 1. If the particle diameter of the conductive polymer layer is kept small, then peeling of that layer can be suppressed, and the latent capacitance of the dielectric layer can be utilized more easily.

It is known that conductive polymer layers formed by electrolytic oxidative polymerization have higher conductivity and better film properties than conductive polymer layers formed by chemical oxidative polymerization. However, when electrolytic oxidative polymerization is carried out repeatedly with a single electrolytic liquid, then the conductivity of the conductive polymer film changes gradually. JP H-11-121279A discloses an electrolytic oxidative polymerization that is carried out while keeping the pH of the polymerization solution within a predetermined range, in order to suppress this change.

JP 2000-297142A discloses that the pH of a polymerization solution used for electrolytic oxidative polymerization is set to 5 or less. Here, it is attempted to increase the rate of the polymerization reaction by reducing the pH.

Thus, a large number of solid electrolytic capacitors having a conductive polymer layer as the solid electrolyte have been studied in depth. However, a solid electrolytic capacitor that has both low ESR and high capacitance, and moreover exhibits low loss, has not been achieved satisfactorily so far.

SUMMARY OF THE INVENTION

In order to address these problems, according to the present invention, a method for manufacturing a solid electrolytic capacitor including an anode conductor that is made of a valve metal, a dielectric layer that is formed on a surface of the anode conductor, and a solid electrolyte that is formed on a surface of the dielectric layer and includes a conductive polymer layer, includes a step of forming, in a first solution, a first conductive polymer film serving as a portion of the conductive polymer layer; and a step of forming, in a second solution whose pH is lower than the pH of the first solution, a second conductive polymer film serving as another portion of the conductive polymer layer; wherein the first conductive polymer film and the second conductive polymer film are both formed by electrolytic oxidative polymerization. It is also possible to form the first and the second conductive polymer film by chemical oxidative polymerization instead of electrolytic oxidative polymerization.

In accordance with the present invention, a solid electrolytic capacitor includes an anode conductor that is made of a valve metal; a dielectric layer that is formed on a surface of the anode conductor; and a solid electrolyte that is formed on a surface of the dielectric layer and includes a conductive polymer layer. The anode conductor includes a plurality of pores. The conductive polymer layer comprises a first conductive polymer film made of a plurality of particles, and a second conductive polymer film having an average particle diameter that is larger than the average particle diameter of the plurality of particles. The second conductive polymer film is formed such that it covers the plurality of pores. The first conductive polymer film is formed such that at least a portion thereof is disposed inside the plurality of pores, or the first conductive polymer film is arranged as an outermost film of the conductive polymer layer.

DESCRIPTION OF THE PREFERRED EMBODIMENTS

The present invention provides a solid electrolytic capacitor that has both a low ESR and a large capacitance, as well as a method for manufacturing the same. The state of a conductive polymer film that is formed by electrolytic oxidative polymerization depends on the pH of the polymerization solution used for the polymerization. Similarly, also the state of a conductive polymer film that is formed by chemical oxidative polymerization depends on the pH of the polymerization solution used for the polymerization. It should be noted that when chemical oxidative polymerization is performed using two solutions, namely a solution including the monomer (monomer solution) and a solution containing the oxidizer (oxidizer solution), and when the pH of the monomer solution is different from the pH of the oxidizer solution, then "pH of the polymerization solution" means the pH of the monomer solution that exerts the larger influence on the reactiveness of the monomers forming the backbone of the polymer.

In general, conductive polymer films made from polymerization solutions having a relatively high pH are made of particles that are finer than conductive polymer films made from polymerization solutions having a relatively low pH, and also their specific surface area is relatively large. Conductive polymer films made from polymerization solutions with a low pH sometimes appear as one continuous bulk body rather than having particle form. It should be noted that throughout this specification, in films that appear as single particles, that is, in which the grain boundaries cannot be observed and that appear to be continuous films, the term "average particle diameter" means the particle diameter of the single particle.

Conventionally, it is known that in polymerization solutions for electrolytic oxidative polymerization, the pH should be adjusted to a predetermined range in order to provide the film with constant characteristics as described above. Furthermore, it is known that the reaction rate of the electrolytic oxidative polymerization is increased in low pH ranges. However, it has not yet been proposed to use a plurality of polymerization solutions that have been adjusted to different pH values, and to layer a plurality of conductive polymer films in which the shape of the film has been adjusted such that a lower ESR and a higher capacitance can be achieved simultaneously, preferably while giving consideration to the shape of the micro-pores formed in the surface of the anode conductor. The conductive polymer films of fine particles are advantageous with regard to filling the micro-pores and widening the surface area outside the layers. On the other hand, conductive polymer films with large particles or continuous films are advantageous with regard to lowering the resistance of that layer.

With regard to this, in one embodiment of the present invention, a first conductive polymer film with relatively small average particle diameter is formed, and a second conductive polymer film with relatively large average particle diameter is formed on top thereof. In other words, a first conductive polymer film is made from a polymerization solution with a relatively large pH, and formed on top thereof is a second conductive polymer film made from a polymerization solution with a relatively small pH. In this case, the first conductive polymer film should be formed such that at least a portion thereof is arranged within the plurality of pores formed in the surface of the anode conductor. To increase the capacitance of the solid electrolytic capacitor and in particular to ensure the capacitance in low frequency regions, it is preferable to fill a conductive polymer down to the deep end of the micro-pores. Furthermore, if the second conductive polymer film is formed so as to cover the aperture of the plurality of pores formed in the anode conductor, then it becomes easy to realize both a high capacitance and a low ESR, and also to ensure the capacitance in low frequency regions.

In another embodiment of the present invention, a first conductive polymer film, which has a relatively small average particle diameter, is formed on top of a second conductive polymer film, which has a relatively large average particle diameter. In other words, the first conductive polymer film, which is made from a polymerization solution with a relatively high pH, is formed on the second conductive polymer film, which is made from a polymerization solution with a relatively low pH. In this case, the first conductive polymer film may be arranged as an outermost film of the conductive polymer layer, that is, as the film in contact with the cathode conductor. This is because in order to lower the ESR of the solid electrolytic capacitor, and in particular to lower the ESR in high frequency regions, it is preferable to decrease the contact resistance by increasing the contact area between the conductive polymer layer and the cathode conductor. Here, the second conductive polymer layer may cover the apertures of the plurality of pores formed in the anode conductor.

In a preferable embodiment of the present invention, a third conductive polymer film serving as yet another portion of the conductive polymer layer is formed. This film may be formed in a third solution whose pH is higher than the second solution for forming the second conductive polymer film. Using this film formation method, the third conductive polymer film can be made of a plurality of particles having an average particle diameter that is smaller than the average particle diameter of the second conductive polymer film. The third conductive polymer film may be formed by the same polymerization methods (electrolytic oxidative polymerization or chemical oxidative polymerization) as the first and the second conductive polymer film.

If a third conductive polymer film is formed, then the first conductive polymer film may be formed such that at least a portion thereof is disposed inside a plurality of pores formed in the anode conductor, the second conductive polymer film may be formed such that it covers apertures of the plurality of pores, and the third conductive polymer film may be formed as an outermost film of the conductive polymer layer. According to this preferable embodiment, it is possible to realize both the filling of the micro-pores with conductive polymer and the increasing of the contact area to the cathode conductor. In that case, the third conductive polymer film functions as a film that widens the surface of the second conductive polymer film.

In the manufacturing method of the present invention, it is suitable that the difference between the pH of the first solution and the pH of the second solution is for example at least 1.5, preferably at least 2.5, and more preferably at least 5. While there is no particular limitation, it is preferable that the first solution is alkaline and the second solution is acidic. The solvent included in the polymerization solution used for the method of the present invention is typically water, but there is no limitation to this, and it may also be a mixture of water an organic solvent (preferably water and an organic solvent compatible with water), or an organic solvent, for example an alcohol such as ethanol or isopropanol.

Ordinarily, it is suitable that the average particle diameter of the particles constituting the conductive polymer film formed inside the micro-pores is not greater than 0.1 $\mu$m, preferably not greater than 0.07 $\mu$m and in particular, 0.01 to 0.1 $\mu$m is suitable. More specifically it is preferable that it is not greater than 30%, more preferably not greater than 20% of the pore diameter corresponding to the most frequent value of the volume content distribution of pore diameters of the plurality of pores formed in the anode conductor. The volume content distribution of pore diameters can be measured by a pore distribution measurement device.

Ordinarily, the average particle diameter of the particles constituting the conductive polymer film formed as the outermost film is suitably not greater than 5 $\mu$m, and preferably not greater than 1 $\mu$m.

For electrolytic oxidative polymerization, for example, the particle diameter of the particles constituting the conductive polymer films is affected by the solvent of the polymerization solution, the dopant, composition and type of monomers, and differences in the polymerization rate due to the applied voltage. However, adjusting the particle diameter by pH is advantageous over adjusting it with these other factors, because the range in which it can be applied without compromising the preferable manufacturing conditions of the solid electrolytic capacitor is large, and it can be applied in addition to adjusting different composition and types.

In general, increasing the ratio with which the micro-pores are filled by the conductive polymer is more important as the micro-pores become deeper. If the average depth of the plurality of pores formed in the anode conductor exceeds 40 $\mu$m, then the necessity increases to form conductive polymer films whose average particle diameter is relatively small such that at least a portion is arranged inside the plurality of pores. On the other hand, if the average depth of the plurality of pores formed in the anode conductor does not exceed 40 $\mu$m, then a large effect of forming the above-described conductive polymer film cannot be expected. In the latter case, placing the focus on reducing manufacturing costs, as a first step of the electrolytic oxidative polymerization, the apertures of the pores should be covered by a conductive polymer film with a relatively large average particle diameter, and as a second step, the contact resistance to the cathode conductor should be reduced by a conductive polymer film with a relatively small average particle diameter.

That is to say, in accordance with another aspect of the present invention, a method for manufacturing a solid electrolytic capacitor comprising an anode conductor that is made of a valve metal, a dielectric layer that is formed on a surface of the anode conductor, and a solid electrolyte that is formed on a surface of the dielectric layer and includes a conductive polymer layer, includes forming at least a portion of the conductive polymer layer by electrolytic oxidative polymerization, wherein ① when an average depth of a plurality of pores formed in the anode conductor exceeds 40 $\mu$m, as a first step of the electrolytic oxidative polymerization, a first conductive polymer film serving as a portion of the conductive polymer layer is formed in a first solution such that at least a portion thereof is arranged within the plurality of pores; as a second step of the electrolytic oxidative polymerization, a second conductive polymer film serving as another portion of the conductive polymer layer is formed in a second solution, whose pH is lower than that of the first solution, such that it covers apertures of the plurality of pores; and ② when an average depth of a plurality of pores formed in the anode conductor is 40 $\mu$m or less, as a first step of the electrolytic oxidative polymerization, a second conductive polymer film serving as a portion of the conductive polymer layer is formed in a first solution such that it covers apertures of the plurality of pores formed in the anode conductor; and as a second step of the electrolytic oxidative polymerization, a first conductive polymer film serving as another portion of the conductive polymer layer is formed as an outermost film of the conductive polymer layer in a second solution, whose pH is higher than that of the first solution. Also here, the first and the second conductive polymer films may be formed by chemical oxidative polymerization instead of electrolytic oxidative polymerization.

The following is an explanation of preferable embodiments of the present invention, with reference to the accompanying drawings.

Figure 1:
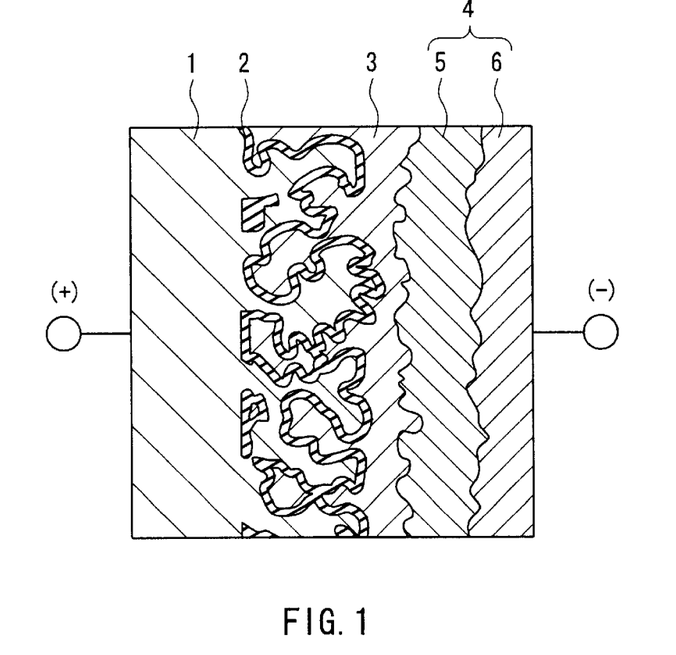
FIG. 1 is a cross-sectional view of an example of the internal electrodes (capacitor element) in a solid electrolytic capacitor according to the present invention.

As shown in FIG. 1, a capacitor element generally has a structure in which a dielectric layer 2, a solid electrolyte 3, and a cathode conductor 4 are layered in that order on an anode conductor 1. The cathode conductor 4 may be of a two-layer structure including a carbon layer 5 and an outer silver/conductive resin layer 6. The anode conductor 1 is made of a metal plate or foil having a valve function or of a sintered body made of metal particles having a valve function, or of a metal foil that has been subjected to a surface-widening process, for example by etching. For the valve metal, it is possible to use tantalum, aluminum, titanium, niobium, zirconium, or an alloy of these. It is preferable to use at least one valve metal selected from tantalum, aluminum and niobium.

The dielectric layer 2 is an oxide film made by electrolytic oxidation of the surface of the anode conductor 1, and is also formed in the hole portions of the sintered body or the etched foil or the like. The thickness of the oxide film can be adjusted by changing the voltage of the electrolytic oxidation.

The solid electrolyte 3 includes at least a conductive polymer layer. It is preferable that the conductive polymer layer includes at least one polymer selected from polypyrrole, polythiophene, polyaniline, poly-3,4-ethylenedioxythiophene, and in particular at least one polymer selected from pyrrole, thiophene and 3,4-ethylenedioxythiophene and their derivatives. The conductive polymer layer can be made by chemical oxidative polymerization using a monomer such as pyrrole, a dopant such as alkylnaphthalene sulphonic acid, and an oxidizer such as iron (iii) sulfate or ammonium persulfate. As will be explained below, it is also possible to form the conductive polymer layer by electrolytic oxidative polymerization instead of or in conjunction with chemical oxidative polymerization.

It should be noted that the solid electrolytic layer 3 may include an oxide conductor such as manganese dioxide or ruthenium oxide, or an organic semiconductor such as a TCNQ complex (7,7,8,8-tetracyanoquino-dimethane complex salt).

Figure 2:
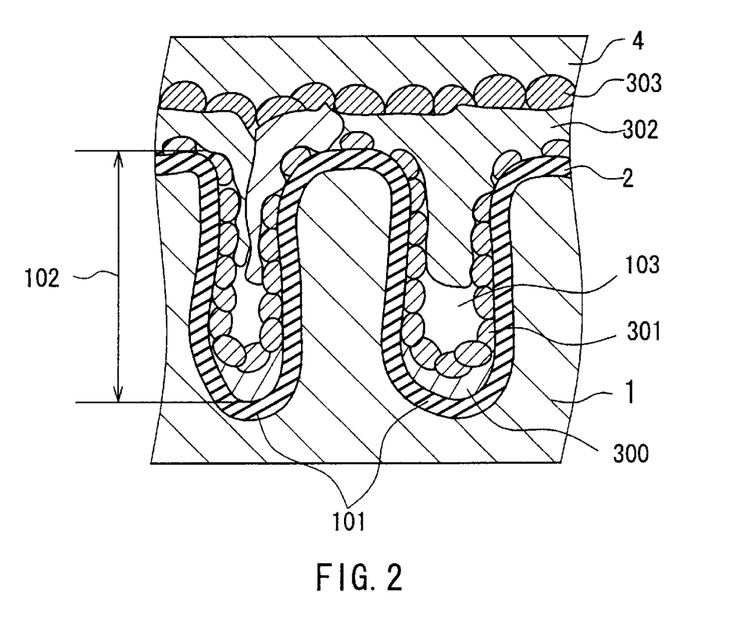
FIG. 2 is a partial magnified view of the cross-sectional view of FIG. 1.

FIG. 2 shows a magnified view of micro-pores 101 of the anode conductor 1. In this solid electrolyte capacitor, the solid electrolyte is made of a conductive film 300 made by chemical oxidative polymerization, and moreover a first conductive polymer film 301, a second conductive polymer film 302 and a third conductive polymer film 303, all made by electrolytic oxidative polymerization. The conductive film 300 may be made of manganese dioxide formed by pyrolysis of manganese nitrate or it may be a conductive polymer film made by chemical oxidative polymerization, for example. The electrolytic oxidative polymerization for forming the three films 301 to 303 is carried out utilizing the conductivity of the film 300.

In the electrolytic oxidative polymerization, the first and the third conductive polymer films 301 and 303 are made from polymerization solutions with a relatively high pH, whereas the second conductive polymer film 302 is made of a polymerization solution with a relatively low pH. As a result, the films 301 and 303 are made of fine particles, whereas the film 302 is made of particles with large particle diameter, and in some cases the entire film is constituted by one particle, that is, it is a continuous film. The first conductive polymer film 301, the second conductive polymer film 302 and the third conductive polymer film 303 are formed in that order such that at least a portion of the first conductive polymer film 301 is arranged inside the micro-pores 101, and preferably substantially covers the surface of the dielectric layer 2 in the micro-pores 101, the second dielectric polymer film 302 covers the apertures of the micro-pores 101, and the third dielectric polymer film 303 is formed as the outermost film contacting the cathode conductor 4.

If the conductive polymer films are arranged in this manner, then the original capacitance of the dielectric film 2 can be brought out by the first conductive polymer film 301, the resistance of the solid electrolyte can be lowered with the second conductive polymer film 302, and the contact resistance to the cathode conductor 4 can be reduced with the third conductive polymer film 303.

When the average of the depth 102 of the micro-pores exceeds 40 $\mu$m, then the advantageous effect of forming first conductive polymer film 301 is large. In capacitors whose structure combines a powder using tantalum or niobium as the valve metal with a lead conductor or a foil, the average depth of the micro-pores often exceeds 40 $\mu$m. Consequently, if tantalum or niobium is used for the valve metal, then the effect that the formation of the first conductive polymer film 301 has on increasing the capacitance is remarkable. As stated above, it is preferable that the average particle diameter of the film 301 is set specifically in correlation to the most frequent pore diameter of the micro-pores 101, but in general, it is preferably not larger than 0.1 $\mu$m. In order to realize this average particle diameter, the pH of the polymerization solution for forming the first conductive polymer 301 should be set to at least 7, for example to 7 to 10 for electrolytic oxidative polymerization, although this also depends on the polymerization method and the type of monomers.

It should be noted that if an etched foil of aluminum is used for the valve metal, then the average depth of the micro-pores may be less than 40 $\mu$m, depending on the method of the pore formation. In this case, it is also possible to omit the formation of the first conductive polymer film 301.

The second conductive polymer film 302 should be deposited such that it covers the apertures of the pores and the outer surface of this film is always at a higher position than the outermost side (i.e. the highest position) of the dielectric layer 2. In other words, it should be deposited to an extent that the outer surface of the film does not enter the inner side of the micro-pores (see FIG. 2). The second conductive polymer film 302 has few particle boundaries and essentially envelops the entire anode conductor 1 as a continuous film, reducing the resistance of the entire conductive polymer layer. The pH of the polymerization solution for forming the second conductive polymer film 302 should be set to not higher than 7, for example to 2 to 7 for electrolytic oxidative polymerization, although this again depends on the polymerization method for example.

The outer surface of the second conductive polymer film 302 is relatively flat, so that to reduce the contact resistance to the cathode conductor, it is preferable to form a third conductive polymer film 303. It is not necessary to restrict the average particle diameter of the third conductive polymer film 303 to the average particle diameter of the first conductive polymer film 301, and in general, the object of increasing surface area can be achieved with an average particle diameter of 5 $\mu$m or less. The pH of the polymerization solution for forming the third conductive polymer film 303 should be set to at least 4.5, for example to 4.5 to 10 for electrolytic oxidative polymerization, although this again depends on the polymerization method for example.

There is no particular restriction regarding the proportion of the conductive polymer film 301 to 303, but when the second conductive polymer film is taken to be 1, then it is preferable that, in terms of weight ratios, the first conductive polymer film 301 is 0.5 to 2 and the third conductive polymer film 303 is 0.1 to 0.5. In the case of electrolytic oxidative polymerization, the weight ratio of the films is substantially proportional to the amount of current that is consumed for the formation of the films, and thus can be controlled through the current.

When forming the second conductive polymer film 302, which has a relatively large average particle diameter, voids 103 that are not filled with conductive polymer may remain in the micro-pores 101. However, the properties of the electrolytic capacitor are more improved when a conductive polymer film 302 with low resistance is formed under relatively low pH than when the micro-pores are filled by continuing the formation of the fine particle conductive polymer.

The above was an explanation for a solid electrolytic capacitor in which the first to third conductive polymer films are formed by electrolytic oxidative polymerization, but it is also possible to attain the same effect as above by chemical oxidative polymerization in which the pH is adjusted suitably. However, changes in the properties of the conductive polymer film due to the pH are more conspicuous when using electrolytic oxidative polymerization than when using chemical oxidative polymerization.

The cathode conductor 4 may be for example a laminate of a carbon layer 5 and an outer silver/conductive resin layer 6. The carbon layer 5 includes carbon particles as the conductive particles, and a tight electrical connection between the silver powder included in the conductive resin layer 6 and the solid electrolytic layer 3 can be secured with these carbon particles.

Although it is not shown in FIG. 1, an anode lead terminal is connected to the anode conductor 1, and a cathode lead terminal is connected to the cathode conductor 4, and moreover, the capacitor element is sealed into an epoxy resin or a jacket resin, thus forming the solid electrolytic capacitor.

Referring to FIGS. 3 to 8, the following is an explanation of the arrangement of the polymerization electrodes during electrolytic oxidative polymerization.

FIGS. 3 to 7 show various examples of arrangements of the polymerization electrodes during electrolytic oxidative polymerization. As shown in these figures, in electrolytic oxidative polymerization a film formation substrate 10 on which the film is to be formed, a polymerization anode (positive electrode) 7 and a polymerization cathode (negative electrode) 8 are immersed in the polymerization solution 9. The anode 7 and the cathode 8 are connected to a power source 12. The film formation substrate 10 is, more specifically, an anode conductor on which at least a dielectric layer has been formed. Ordinarily, the anode 7 is fixed near the film formation substrate 10. In that case, it is preferable that the anode 7 and the cathode 8 are arranged such that at least a portion of the film formation substrate 10 is disposed between the electrodes 7 and 8, as shown FIG. 3 and FIG. 4. In the arrangement shown in FIG. 7, growth towards the cathode side, that is, the direction away from the surface of the substrate 10, tends to be larger for the conductive polymer formed on the surface 11 of the film formation substrate 10 facing the cathode 8, and this directionality of the film growth may affect the adherence of the conductive polymer film on this surface. The influence of the electrode arrangement is particularly noticeable with polymerization solutions that have a relatively low pH and are for example acidic. This is because in polymerization solutions with a low pH (for example less than 7), the conductive polymer grows fast, and the conductive polymer film tends to become a continuous film.

That is to say, with the method of the present invention, it is preferable to form at least one film constituting the conductive polymer layer, for example at least one selected from the first conductive polymer film and the second conductive polymer film by arranging the anode and the cathode such that at least a portion of the film formation substrate including the anode conductor and the dielectric layer is disposed between these electrodes, and carrying out the electrolytic oxidative polymerization using the anode and the cathode.

Figure 5:
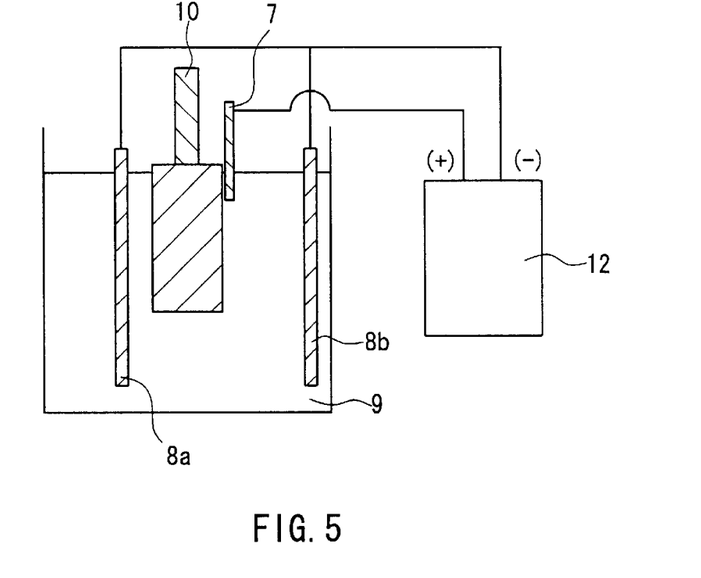
FIG. 5 illustrates yet another example of the arrangement of the polymerization electrodes used in an embodiment of the method of the present invention.
Figure 6:
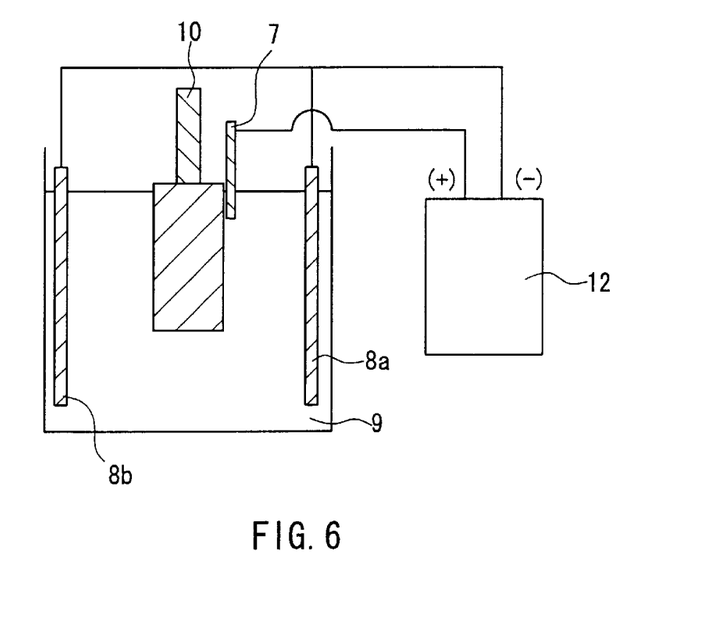
FIG. 6 illustrates yet a further example of the arrangement of the polymerization electrodes used in an embodiment of the method of the present invention.
Figure 7:
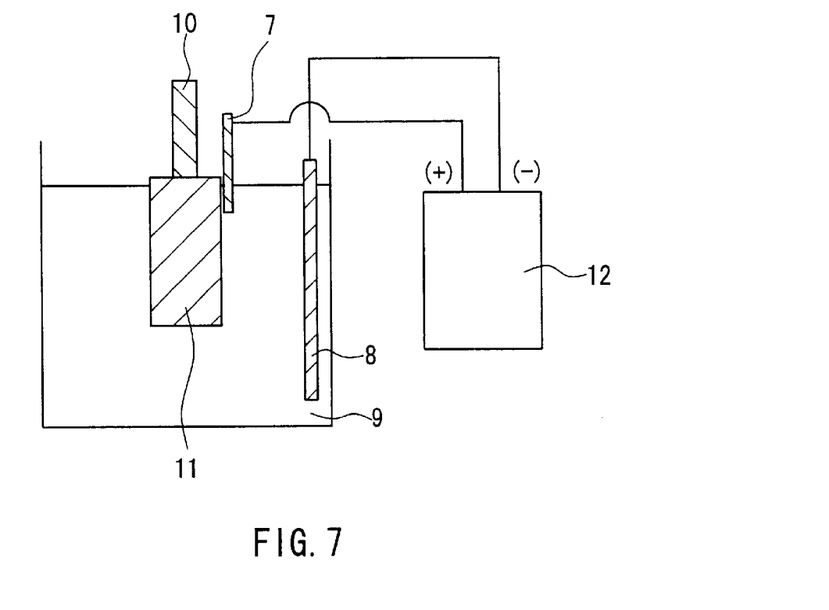
FIG. 7 illustrates yet a further example of the arrangement of the polymerization electrodes used in an embodiment of the method of the present invention.

As shown in FIGS. 5 and 6, if a plurality of cathodes 8a and 8b are provided, then not only should at least a portion of the film formation substrate 10 be disposed between the anode 7 and at least one cathode 8a (8b) (see FIGS. 5 and 6), but at least a portion of the film formation substrate 10 should be disposed between the anode 7 corresponding to the film formation substrate 10 and the cathode 8a, which is closest to the anode 7 (see FIG. 5). With this arrangement, it is easier to apply a suitable electric field than when the film formation substrate 10 is arranged between the anode 7 and the relatively distant cathode 8b (see FIG. 6).

Figure 8:
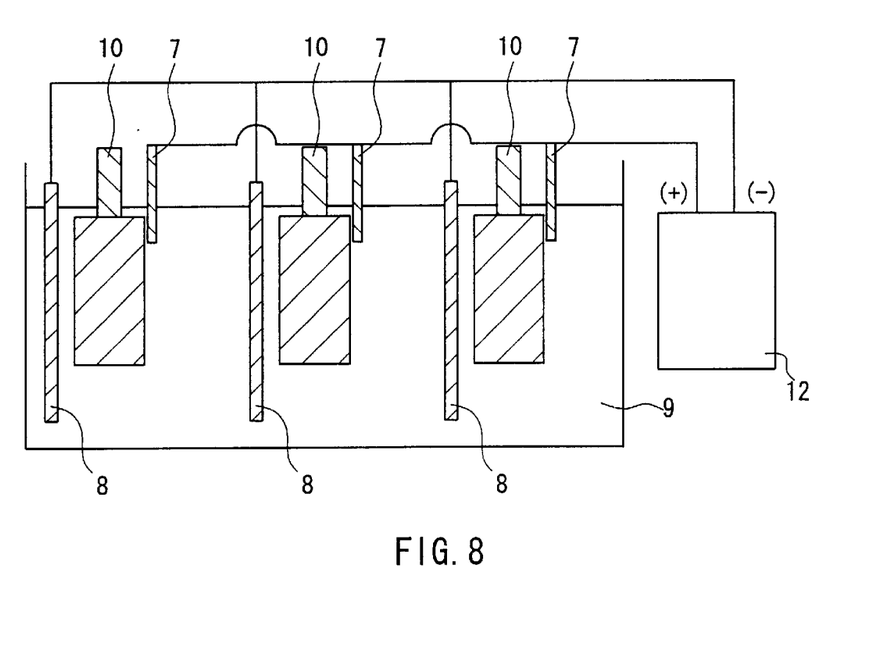
FIG. 8 illustrates an example of the arrangement of the polymerization electrodes in which the method of the present invention is applied simultaneously to a plurality of film formation substrates.

In the actual manufacturing steps, this arrangement becomes important if electrolytic oxidative polymerization is performed using the same polymerization solution for a plurality of film formation substrates (see FIG. 8). That is to say, it is preferable that a plurality of film formation substrates 10 and a plurality of anodes (positive electrodes) 7 corresponding to those film formation substrates 10 are prepared, and the plurality of anodes 7 are arranged such that at least a portion of the film formation substrates 10 corresponding to the respective anodes 7 is disposed between the corresponding anode 7 and the cathode (negative electrode) 8 closest to that anode 7. This arrangement constitutes another aspect of the present invention.

That is to say, the present invention provides a method for manufacturing a solid electrolytic capacitor including an anode conductor that is made of a valve metal, a dielectric layer that is formed on a surface of the anode conductor, and a solid electrolyte that is formed on a surface of the dielectric layer and includes a conductive polymer layer. A plurality of film formation substrates and a plurality of positive electrodes corresponding to those film formation substrates are prepared, the film formation substrates being constituted by the aforementioned anode on which at least the dielectric layer is formed. For each of the positive electrodes, at least a portion of the film formation substrate corresponding to that positive electrode is disposed between the positive electrode and the negative electrode closest to that positive electrode, and at least a portion of the conductive polymer layer is formed by electrolytic oxidative polymerization with that arrangement. In accordance with this manufacturing method, a conductive polymer layer with superior adherence can be formed efficiently.

WORKING EXAMPLES

Working Example 1
Preparatory Experiment

First, the influence that differing pH values have on the electrolytic oxidative polymerization was confirmed. The solid electrolytic capacitor that was fabricated has the same configuration as shown in FIG. 1.

First, a fine powder of tantalum metal having a valve function and a specific surface area of 70000 $\mu$F·V/g was formed to 1.4 mm×3.0 mm×3.8 mm, was provided with a tantalum wire lead for extracting the anode and was vacuum sintered, thus fabricating an anode conductor made of sintered pellets. Next, a tantalum oxide film serving as the dielectric layer was formed on the surface of the anode conductor by chemically converting this anode conductor in a 5 wt % aqueous solution of phosphoric acid at 90° C. and an applied voltage of 30 V. The average depth of the micro-pores in this anode conductor was half the thickness of the compact (1.4 mm), that is 700 $\mu$m.

After rinsing and drying the anode conductor, a solid electrolyte was formed. In this working example, poly-3,4-ethylenedioxythiophene was formed as a conductive polymer. First, chemical oxidative polymerization was carried out in order to provide the dielectric layer with conductivity. The polymerization solution was prepared by mixing 3 g of 3,4-ethylenedioxythiophene, 70 g of a 40 wt % n-butanol solution of alkylnaphthalene iron (III) sulphonate, and 10 g of n-butanol. The anode conductor was immersed in this polymerization solution, and then dried in air at 40° C. to 150° C. This procedure was repeated three times, thus carrying out the chemical oxidative polymerization. After that, reformation was carried out in a solution of phosphoric acid of about 0.05% concentration at a reformation voltage of 18V, and the dielectric layer was repaired. Furthermore, the anode conductor was rinsed in pure water at about 90° C., and dried in air at about 120° C. Thus, as the film formation substrate for electrolytic oxidative polymerization, an anode conductor was obtained on which an electrolytic layer and a conductive polymer film attained by chemical oxidative polymerization were formed.

Figure 3:
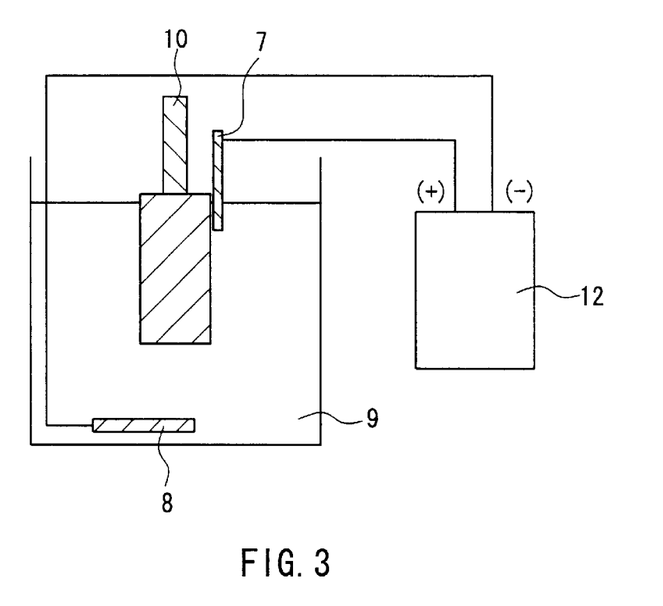
FIG. 3 illustrates an example of the arrangement of the polymerization electrodes used in an embodiment of the method of the present invention.
Figure 4:
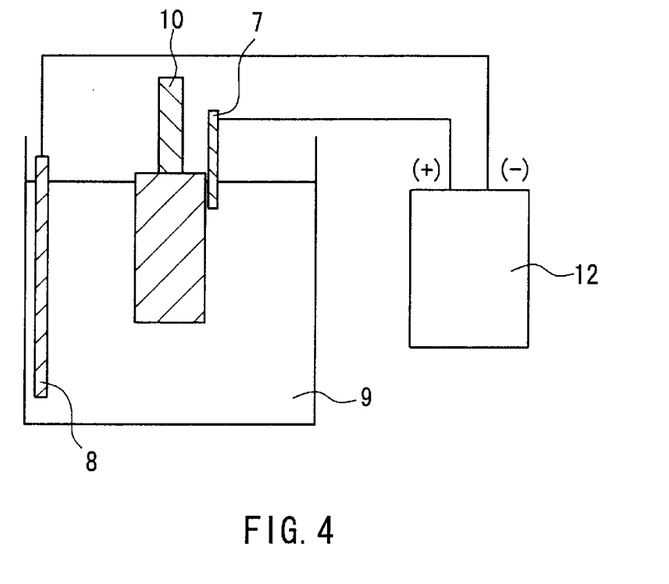
FIG. 4 illustrates another example of the arrangement of the polymerization electrodes used in an embodiment of the method of the present invention.

The arrangement of the electrodes for the electrolytic oxidative polymerization was as shown in FIG. 3. As the positive electrode, carbon fibers of 50 μm fiber diameter were fixed near the film formation substrate, and immersed in the polymerization solution together with the negative electrode. The polymerization solution was prepared by mixing 100 g of a 40 wt % aqueous solution of alkylnaphtalene sodium sulphonate, 10 g of 3,4-ethylenedioxythiophene, 500 g water and a predetermined amount of sulfuric acid. Here, sulfuric acid was added to adjust the pH to a predetermined value (2, 4.5, 7 or 10).

The electrolytic oxidative polymerization was performed at an applied voltage of 2.5 V. The polymerization time was adjusted such that the thickness of the conductive polymer layer formed on the surface of the film formation substrate was in all cases about 20 μm.

Subsequently, the anode conductor on which the conductive polymer layer had been formed was immersed in an aqueous suspension containing carbon powder particles, and was then exposed to 130° C. air for 30 min, to dry and harden the suspension liquid. Thus, a carbon layer was formed on the conductive polymer layer. Then, it was immersed in a silver paint solution and left there for one hour at room temperature, and then retrieved and exposed to 145° C. air for one hour to dry and harden the silver paint. Thus, an outer silver/conductive resin layer was formed on the carbon layer.

Furthermore, a cathode lead terminal was connected with a silver conductive adhesive to the cathode conductor made of the carbon layer and the outer silver/conductive resin layer, and the tantalum wire leading out from the anode conductor was welded to the anode lead terminal. Finally, the capacitor element was packaged into epoxy resin, thus finishing the solid electrolytic capacitor.

For the thusly obtained solid electrolytic capacitors, the static capacitance at frequencies of 120 Hz and 100 kHz as well as the ESR at frequencies of 100 kHz and 1 MHz were measured. Moreover, a voltage of 10 V was applied to the solid electrolytic capacitors, and the current after 1 min was measured and taken as the leakage current. The results are shown in Table 1. In Table 1, the values in the upper rows indicate the maximum and minimum values of 20 samples, whereas the values in the lower rows indicate the average values.

TABLE 1

| pH | 120 Hz capacitance ($\mu$F) | 100 kHz capacitance ($\mu$F) | 100 kHz ESR (m$\Omega$) | 1 MHz ESR (m$\Omega$) | leakage current ($\mu$A) |
| --- | --- | --- | --- | --- | --- |
| 2 | 137–150 | 125–136 | 21–29 | 19–26 | 7–24 |
|   | 143 | 132 | 24 | 22 | 12 |
| 4.5 | 140–150 | 115–133 | 22–31 | 18–26 | 8–27 |
|   | 146 | 125 | 25 | 21 | 16 |
| 7 | 143–162 | 101–117 | 26–33 | 16–23 | 13–30 |
|   | 152 | 115 | 28 | 20 | 21 |
| 10 | 147–165 | 94–111 | 29–35 | 16–22 | 19–42 |
|   | 156 | 104 | 31 | 20 | 28 |

As shown in Table 1, at 120 Hz the capacitance was larger the higher the pH was, whereas at 100 kHz the capacitance was larger the lower the pH was. It seems that this is because in low frequency regions around 120 Hz, it is possible to take advantage of the capacitance of the high-resistance regions in the micro-pores, but when the frequency becomes as high as 100 kHz, then only the capacitance of the low-resistance regions can be utilized, and the influence of the resistance value of the conductive polymer itself becomes relatively large. In conductive polymers of fine particles made at high pH, the micro-pores can be filled easily and film peeling due to film contraction when drying hardly occurs. By contrast, conductive polymers formed at low pH have a low resistance.

Moreover, the ESR at 100 kHz was smaller the lower the pH was, and the ESR at 1 MHz was smaller the higher the pH was. As a result, this suggests that in the frequency region of about 100 kHz it is advantageous to make the resistance of the conductive polymer low and to increase the current collecting effect, but in the frequency region of about 1 MHz, priority should be given to the influence of the contact resistance to the cathode conductor.

Examining the conductive polymer layers formed with the polymerization solutions with a scanning electron microscope (SEM), it could be confirmed that the conductive polymer layers have finer particles the higher the pH of the polymerization solution. According to the examination by SEM, when the pH was 2, 7 and 10, the average particle diameter of the particles constituting the conductive polymer layers was 1.5 μm, 0.5 μm and 0.07 μm, respectively, and the largest particle diameters were 20 μm, 5 μm and 1 μm, respectively. The films formed at pH 2 included substantially no particles having a particle diameter smaller than the maximum particle diameter (1 μm) of the films formed at pH 10. Thus, it is preferable that conductive polymer films formed from a polymerization solution with a relatively low pH are made of particles having a particle diameter that is larger than the maximum particle diameter of the particles constituting the films made by conductive polymer films with relatively high pH, or that they are formed by a single particle (i.e. are continuous films).

Leakage currents were smaller at low pH values. It seems that this is because conductive polymer films with large particle diameter are better suited as protective films against the mechanical stress that occurs during terminal connection and molding the packaging resin.

Figure 9:
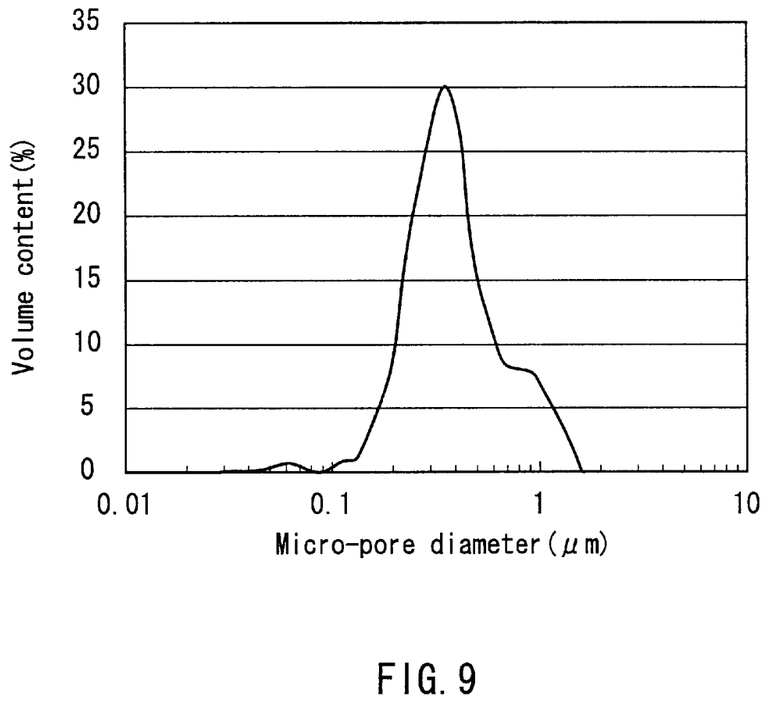
FIG. 9 shows an example of the volume content distribution of the micro-pores formed in the anode conductor.

The micro-pore distribution in anode conductors fabricated as described above was measured using an automatic porosimeter. In particular, it was measured using a "Micrometritics Automated Mercury Porosimeter; Autopore IV9520" by Shimadzu Corp. The results are shown in FIG. 9. The most frequent micro-pore diameter of the anode conductor was about 0.35 μm. In order to make the relative surface area even larger in order to increase the capacitance further, it is preferable to use a fine metal powder that has a large specific surface area of up to over 100,000 μF·V/g. In order to fully utilize the capacitance in this case, it is preferable to provide the conductive polymer layer with even finer particles, for example to set the largest particle diameter to not greater than 0.1 μm and the average particle diameter to not greater than 0.07 μm.

Sample Fabrication

Based on the above results, electrolytic oxidative polymerization was performed using two polymerization solutions with different pH values.

The procedure up to the formation of the conductive polymer film by chemical oxidative polymerization was the same as in the preparatory experiment. In the electrolytic oxidative polymerization, the polymerization solutions, arrangement of the electrodes and the applied voltage were the same as in the preparatory experiment. However, electrolytic oxidative polymerization was performed using a series of polymerization solutions with different pH values.

First, electrolytic oxidative polymerization was performed for 40 min using a polymerization solution of pH 10 to form a first conductive polymer film. Then, electrolytic oxidative polymerization was performed for 15 min using a polymerization solution of pH 2 to form a second conductive polymer film. Thereafter, a solid electrolytic capacitor (Sample 1) was obtained in the same manner as in the preparatory experiment.

Separately therefrom, electrolytic oxidative polymerization was performed for 40 min using a polymerization solution of pH 10 to form a first conductive polymer film. Then electrolytic oxidative polymerization was performed for 12 min using a polymerization solution of pH 2 to form a second conductive polymer film, and furthermore electrolytic oxidative polymerization was performed for 5 min using a polymerization solution of pH 7 to form a third conductive polymer film. Thereafter, a solid electrolytic capacitor (Sample 2) was obtained in the same manner as in the preparatory experiment.

It should be noted that the total amount of current used for the electrolytic oxidative polymerization in Samples 1 and 2 was substantially the same. Furthermore, for the amount of current consumed for the electrolytic oxidative polymerization in Sample 1, taking the current amount for the formation of the second conductive polymer film as 1, the value for the first conductive polymer film was set to 1. For the amount of current consumed for the electrolytic oxidative polymerization in Sample 2, similarly taking the current amount for the formation of the second conductive polymer film as 1, the value for the first conductive polymer film was set to 1.25 and the value for the third conductive polymer film was set to 0.3. The proportions of the consumed current correspond to the weight ratios of the conductive polymer films.

The Samples 1 and 2 were measured in the same manner as the preparatory experiment. The results are shown in Table 2.

TABLE 2

|  | 120 Hz capacitance ($\mu$F) | 100 kHz capacitance ($\mu$F) | 100 kHz ESR (m$\Omega$) | 1 MHz ESR (m$\Omega$) | leakage current ($\mu$A) |
| --- | --- | --- | --- | --- | --- |
| Sample 1 | 145–166 155 | 130–149 140 | 20–26 22 | 17–21 20 | 5–18 11 |
| Sample 2 | 145–170 156 | 132–153 142 | 18–25 21 | 15–20 18 | 3–13 9 |

From Table 2, it can be seen that both Sample 1 and 2 have high capacitance and lower ESR from a low frequency region to a high frequency region, and moreover leakage currents are suppressed.

Moreover, an anode conductor was fabricated by forming ink made of tantalum powder that has been processed into paint to a thickness of about 40 $\mu$m on both faces of a tantalum foil of 25 $\mu$m, removing the binder and vacuum sintering. The average depth of the micro-pores in this anode conductor was 40 $\mu$m. Using this anode conductor, a solid electrolytic capacitor was fabricated (Sample 3) in the same manner as Sample 2. Moreover, a further solid electrolytic capacitor (Sample 4) was fabricated in the same manner as Sample 2, except that the first conductive polymer film was formed at the same amount with the same polymerization solution as the second conductive polymer film. Comparing the properties of those two capacitors, it was found that Sample 4 had a slightly poorer capacitance at 120 Hz. However, the degree to which the properties became poorer due to leaving out the first conductive polymer film of fine particles was much smaller than in solid electrolytic capacitors with deep micro-pores using tantalum as the valve metal.

Working Example 2

In Working Example 2, chemical oxidative polymerization was used as the polymerization method.

0.1 mol/l pyrrole serving as monomers and the Na salt of 0.02 mol/l alkylnaphthalene sulphonic acid were dissolved in an aqueous solution containing 10 vol % isopropyl alcohol, and to this, sulfuric acid or sodium hydroxide were added, and monomer solutions with a pH of 2, 4.5, 7 and 10 were prepared. On the other hand, 0.1 mol/l sodium persulfate and the Na salt of 0.05 mol/l alkylnaphthalene sulphonic acid were dissolved as oxidizers in an aqueous solution containing 10 vol % isopropyl alcohol, and oxidizer solutions with a pH of 2, 4.5, 7 and 10 were prepared by adding sulfuric acid or sodium hydroxide to this.

An anode conductor on which a dielectric layer was formed as in Working Example 1 was immersed in the monomer solution with pH 2, and then was immersed in the oxidizer solution with pH 2, thereby forming a polypyrrole film on the dielectric layer, after which it was rinsed and dried. While repeating this polypyrrole film formation step 40 times, the anode conductor was reformed in a phosphoric acid solution of about 0.05% concentration, repairing the dielectric layer. The reformation voltage was set to 18 V. Then, the anode conductor was rinsed in pure water of about 90° C., and dried in air of about 120° C., and the conductive polymer layer was formed. Thereafter, solid electrolytic capacitors were obtained in the same manner as in Working Example 1. Solid electrolytic capacitors were obtained in the same manner for the various pH values.

When the properties of the solid electrolytic capacitors were measured in the same manner as described above, it was found that the dependency of the solid electrolytic capacitor properties on the pH of the polymerization solution was similar to that in Working Example 1. It should be noted that here, the monomer solution and the oxidizer solution were set to the same pH values in order to achieve a constant polymerization rate, but embodiments of the present invention that are applied to chemical oxidative polymerization are not limited to this. It is also possible to attain the same effect by adjusting only the pH of the monomer solution.

Furthermore, also when using poly-3,4-ethylenedioxythiophene instead of polypyrrole for the conductive polymer, the dependency of the film properties on the pH of the polymerization solution for the chemical oxidative polymerization was similar. However, since the polymerization rate of poly-3,4-ethylenedioxythiophene is extremely slow, it is necessary to adjust the pH for forming the conductive polymer layers to a lower value than in the case of pyrrole.

The poly-3,4-ethylenedioxythiophene film was formed using a monomer solution obtained by mixing 100 g of a 40 wt % aqueous solution of alkylnaphtalene sodium sulfonate, 10 g of 3,4-ethylenedioxythiophene, and 500 g water, and adding sulfuric acid as appropriate, and an oxidizer solution obtained by dissolving as oxidizers 0.1 mol/l sodium persulfate and the Na salt of 0.05 mol/l alkylnaphthalene sulfonic acid in an aqueous solution containing 10 vol % of isopropyl alcohol, and adding sulfuric acid or sodium hydroxide as appropriate.

The invention may be embodied in other specific forms without departing from the spirit or essential characteristics thereof. The embodiments disclosed in this application are to be considered in all respects as illustrative and not restrictive, the scope of the invention being indicated by the appended claims rather than by the foregoing description.

All changes that come within the meaning and range of equivalency of the claims are intended to be embraced therein.

What is claimed is:

1. A method for manufacturing a solid electrolytic capacitor comprising an anode conductor that is made of a valve metal, a dielectric layer that is formed on a surface of the anode conductor, and a solid electrolyte that is formed on a surface of the dielectric layer and includes a conductive polymer layer, the method comprising:
   forming, in a first solution, a first conductive polymer film serving as a portion of the conductive polymer layer; and
   forming, in a second solution whose pH is lower than the pH of the first solution, a second conductive polymer film serving as another portion of the conductive polymer layer;
   wherein the first conductive polymer film and the second conductive polymer film are both formed by electrolytic oxidative polymerization.

2. The method for manufacturing a solid electrolytic capacitor according to claim 1, wherein the first conductive polymer film and the second conductive polymer film are both formed by chemical oxidative polymerization instead of electrolytic oxidative polymerization.

3. The method for manufacturing a solid electrolytic capacitor according to claim 1, wherein the second conductive polymer film is formed on the first conductive polymer film.

4. The method for manufacturing a solid electrolytic capacitor according to claim 3, wherein the first conductive polymer film is formed such that at least a portion thereof is disposed inside a plurality of pores formed in the anode conductor, and the second conductive polymer film is formed such that it covers apertures of the plurality of pores.

5. The method for manufacturing a solid electrolytic capacitor according to claim 3, further comprising a step of forming, in a third solution having a pH that is higher than that of the second solution, a third conductive polymer film serving as yet another portion of the conductive polymer layer on the second conductive polymer film.

6. The method for manufacturing a solid electrolytic capacitor according to claim 5, wherein the first conductive polymer film is formed such that at least a portion thereof is disposed inside a plurality of pores formed in the anode conductor, the second conductive polymer film is formed such that it covers apertures of the plurality of pores, and the third conductive polymer film is formed as an outermost film of the conductive polymer layer.

7. The method for manufacturing a solid electrolytic capacitor according to claim 1, wherein the first conductive polymer film is formed as an outermost film of the conductive polymer layer on the second conductive polymer film.

8. The method for manufacturing a solid electrolytic capacitor according to claim 1, wherein the difference between the pH of the first solution and the pH of the second solution is at least 2.5.

9. The method for manufacturing a solid electrolytic capacitor according to claim 1, wherein the first solution is alkaline and the second solution is acidic.

10. The method for manufacturing a solid electrolytic capacitor according to claim 1, wherein at least one selected from the first conductive polymer film and the second conductive polymer film is formed by arranging a positive electrode and a negative electrode such that at least a portion of a film formation substrate including the anode conductor and the dielectric layer is disposed between these electrodes, and carrying out electrolytic oxidative polymerization using the positive electrode and the negative electrode.

11. The method for manufacturing a solid electrolytic capacitor according to claim 10, wherein a plurality of film formation substrates and a plurality of positive electrodes corresponding to those film formation substrates are prepared; and
   wherein for each of the positive electrodes, at least a portion of the film formation substrate corresponding to that positive electrode is disposed between the positive electrode and the negative electrode closest to that positive electrode.

12. A method for manufacturing a solid electrolytic capacitor comprising an anode conductor that is made of a valve metal, a dielectric layer that is formed on a surface of the anode conductor, and a solid electrolyte that is formed on a surface of the dielectric layer and includes a conductive polymer layer, the method comprising:
   forming at least a portion of the conductive polymer layer by electrolytic oxidative polymerization;
   wherein, when an average depth of a plurality of pores formed in the anode conductor exceeds 40 $\mu$m,
      as a first step of the electrolytic oxidative polymerization, a first conductive polymer film serving as a portion of the conductive polymer layer is formed in a first solution such that at least a portion thereof is arranged within the plurality of pores;
      as a second step of the electrolytic oxidative polymerization, a second conductive polymer film serving as another portion of the conductive polymer layer is formed in a second solution, whose pH is lower than that of the first solution, such that it covers apertures of the plurality of pores;
   and when an average depth of a plurality of pores formed in the anode conductor is 40 $\mu$m or less,
      as a first step of the electrolytic oxidative polymerization, a second conductive polymer film serving as a portion of the conductive polymer layer is formed in a second solution such that it covers apertures of the plurality of pores formed in the anode conductor;
      as a second step of the electrolytic oxidative polymerization, a first conductive polymer film serving as another portion of the conductive polymer layer is formed as an outermost film of the conductive polymer layer in a first solution, whose pH is higher than that of the second solution.

13. A solid electrolytic capacitor, comprising:
   an anode conductor that is made of a valve metal;
   a dielectric layer that is formed on a surface of the anode conductor; and
   a solid electrolyte that is formed on a surface of the dielectric layer and includes a conductive polymer layer;
   wherein the anode conductor includes a plurality of pores;
   wherein the conductive polymer layer comprises a first conductive polymer film made of a plurality of particles, and a second conductive polymer film having an average particle diameter that is larger than the average particle diameter of said plurality of particles;
   wherein the second conductive polymer film is formed such that it covers the plurality of pores; and
   wherein the first conductive polymer film is formed such that at least a portion thereof is disposed inside the plurality of pores, or the first conductive polymer film is arranged as an outermost film of the conductive polymer layer.

14. The solid electrolytic capacitor according to claim 13, wherein the conductive polymer layer further includes a third conductive polymer film made of a plurality of particles having an average particle diameter that is smaller than the average particles size of the second conductive polymer film, the first conductive polymer film is formed such that at least a portion thereof is disposed inside the plurality of pores, and the third conductive polymer film is arranged as an outermost film of the conductive polymer film.

15. The solid electrolytic capacitor according to claim 13, wherein the first conductive polymer film is arranged as an outermost film of the conductive polymer layer, and the average particle diameter of the plurality of particles constituting the first conductive polymer film is not greater than 5 μm.

16. The solid electrolytic capacitor according to claim 13, wherein the first conductive polymer film is formed such that at least a portion thereof is disposed inside the plurality of pores, and the average particle diameter of the plurality of particles constituting the first conductive polymer film is not greater than 0.1 μm.

17. The solid electrolytic capacitor according to claim 13, wherein the first conductive film is formed such that at least a portion thereof is disposed inside the plurality of pores, and the average particle diameter of the plurality of particles constituting the first conductive polymer film is not greater than 20% of the pore diameter corresponding to the most frequent value of the volume content distribution of pore diameters of the plurality of pores.

18. The solid electrolytic capacitor according to claim 13, wherein the first conductive film is formed such that at least a portion thereof is disposed inside the plurality of pores, and the average depth of the plurality of pores exceeds 40 μm.

19. The solid electrolytic capacitor according to claim 13, wherein the valve metal is at least one metal selected from aluminum, tantalum and niobium.

20. The solid electrolytic capacitor according to claim 13, wherein at least one selected from the first conductive polymer film and the second conductive polymer film includes at least one polymer of a material selected from pyrrole, thiophene and 3,4-ethylenedioxythiophene and their derivatives.

\* \* \* \* \*